United States Patent [19]
Shirotori et al.

[11] Patent Number: 5,920,888
[45] Date of Patent: Jul. 6, 1999

[54] CACHE MEMORY SYSTEM HAVING HIGH AND LOW SPEED AND POWER CONSUMPTION MODES IN WHICH DIFFERENT WAYS ARE SELECTIVELY ENABLED DEPENDING ON A REFERENCE CLOCK FREQUENCY

[75] Inventors: Tsukasa Shirotori; Shigeyuki Hayakawa, both of Tokyo, Japan

[73] Assignee: Kabushiki Kaisha Toshiba, Kawasaki-shi, Japan

[21] Appl. No.: 08/837,876

[22] Filed: Feb. 12, 1997

[30] Foreign Application Priority Data

Feb. 15, 1996 [JP] Japan ......................................... 8-28103

[51] Int. Cl.$^6$ ............................... G06F 13/00; G06F 1/32
[52] U.S. Cl. ............... 711/128; 395/750.04; 395/750.06; 395/556
[58] Field of Search ............................. 711/167, 5, 128; 395/750.03, 750.05, 750.06, 750.04, 556, 559

[56] References Cited

U.S. PATENT DOCUMENTS

| | | | |
|---|---|---|---|
| 5,014,195 | 5/1991 | Farrell et al. ............................. | 711/128 |
| 5,682,515 | 10/1997 | Lau et al. ................................. | 711/128 |
| 5,715,426 | 2/1998 | Takahashi et al. ....................... | 711/128 |
| 5,717,892 | 2/1998 | Oldfield .................................. | 711/128 |
| 5,752,045 | 5/1998 | Chen .................................. | 395/750.03 |
| 5,761,715 | 6/1998 | Takahashi ............................... | 711/128 |
| 5,778,428 | 7/1998 | Batson et al. ............................ | 711/128 |

*Primary Examiner*—Glenn Gossage
*Attorney, Agent, or Firm*—Foley & Lardner

[57] ABSTRACT

A cache memory automatically sets a low-, semi-, or high-speed mode operation according to a result of comparison between a half-period of a reference clock signal and a pulse width of a reference pulse signal provided by a reference pulse signal generator. Namely, a start signal generator generates a start signal used to access data memories, according to the frequency of the reference clock signal and a difference between the reference clock and pulse signals. According to the start signal and information indicating a hit tag memory, the cache memory dynamically switches the modes from one to another, without external instructions to the cache memory. In one embodiment, the cache memory is an n-way set associative cache memory having a plurality of data memories, and an enable signal is supplied only to a data memory associated with the hit tag memory when receiving hit information before a low speed mode start signal, or to all of the data memories when receiving the hit information after the high-speed mode start signal.

19 Claims, 11 Drawing Sheets

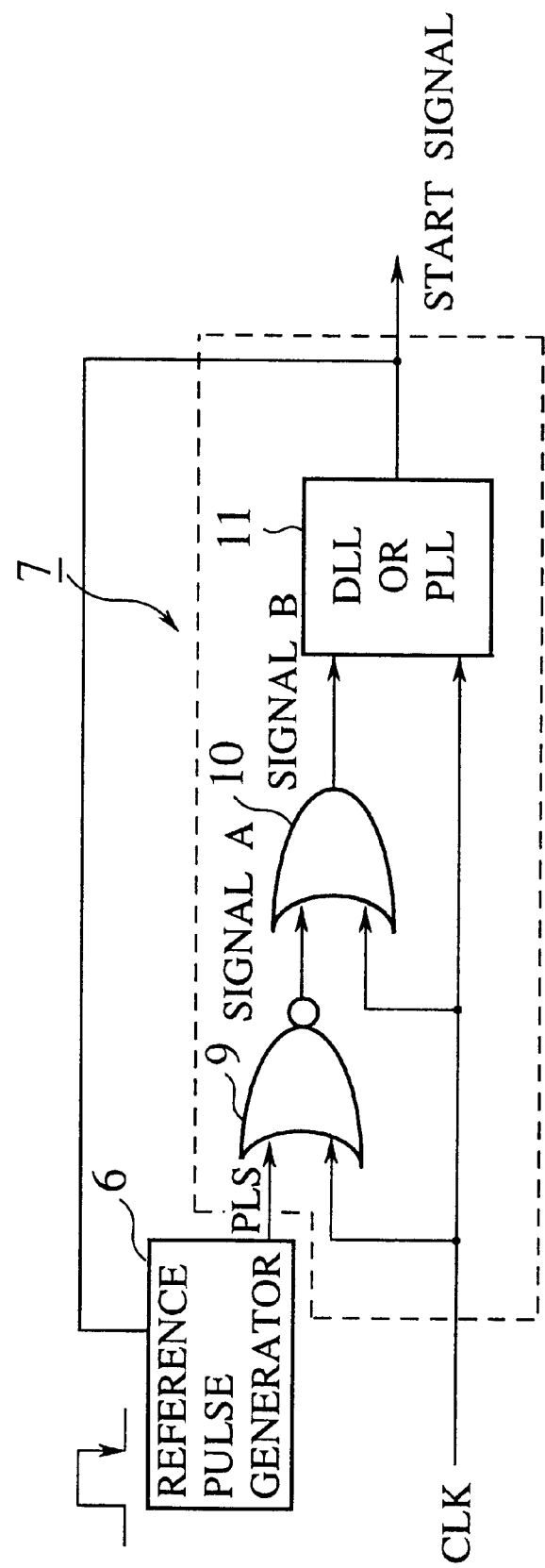

INITIAL STATE
- CLK
- PLS
- SIGNAL A
- SIGNAL B
- START SIGNAL

TRANSIENT STATE
- CLK
- PLS
- SIGNAL A
- SIGNAL B
- START SIGNAL

LOCKED STATE
- CLK
- PLS
- SIGNAL A
- SIGNAL B
- START SIGNAL

BEGIN DATA-ACCESS
BEGIN TAG-ACCESS

BEGIN DATA-ACCESS
BEGIN TAG-ACCESS

BEGIN TAG-ACCESS AND DATA-ACCESS

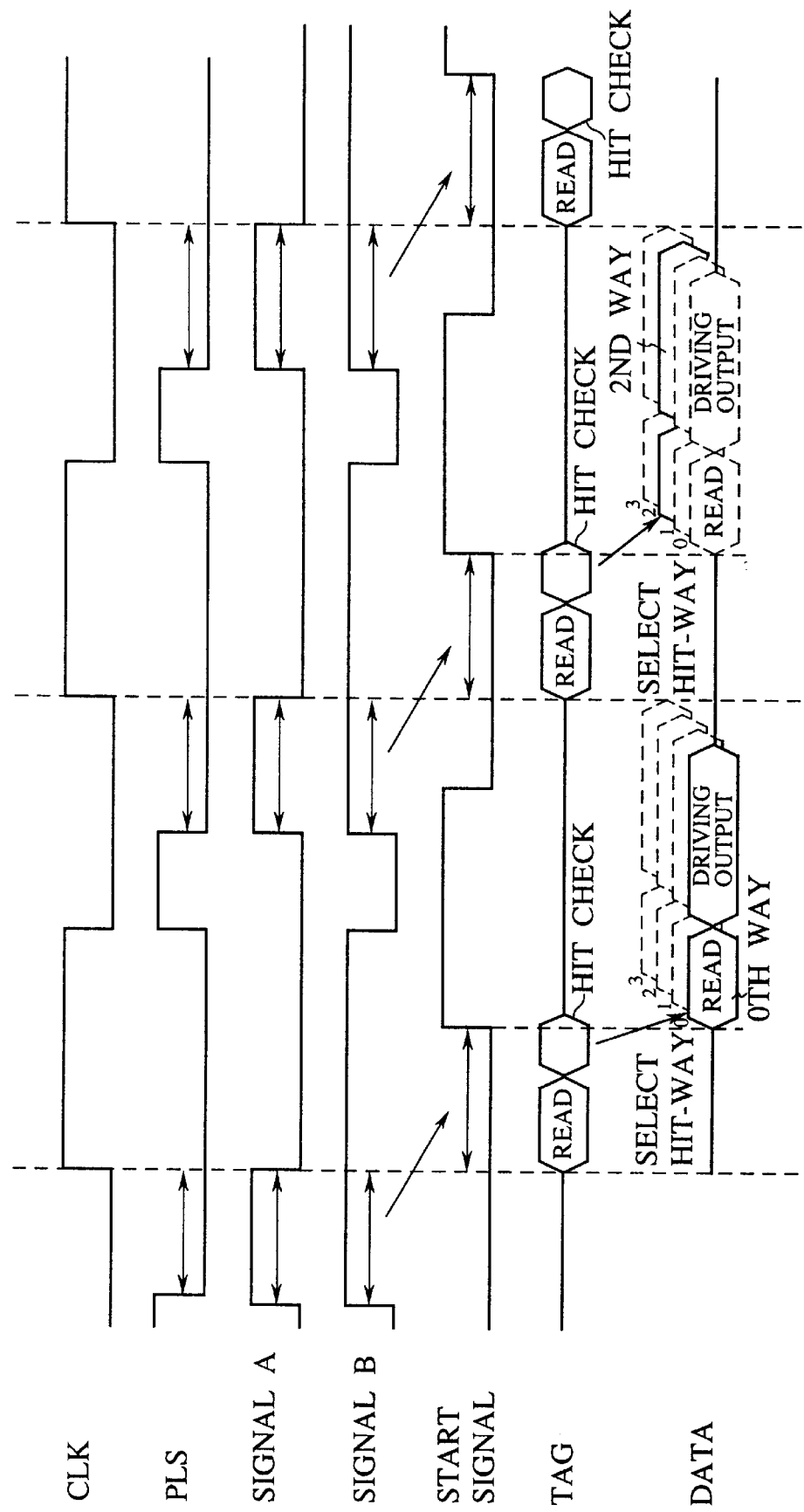

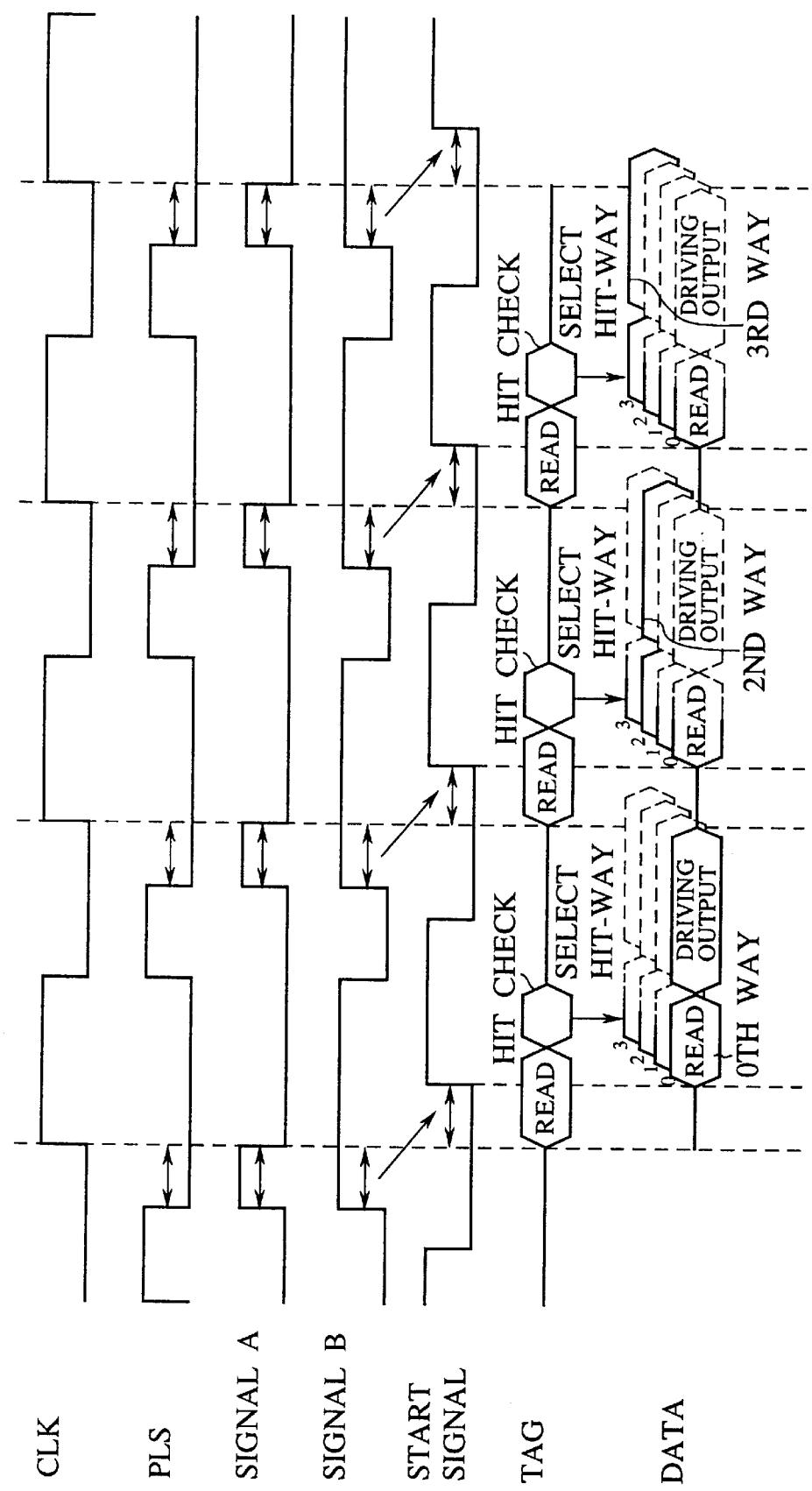

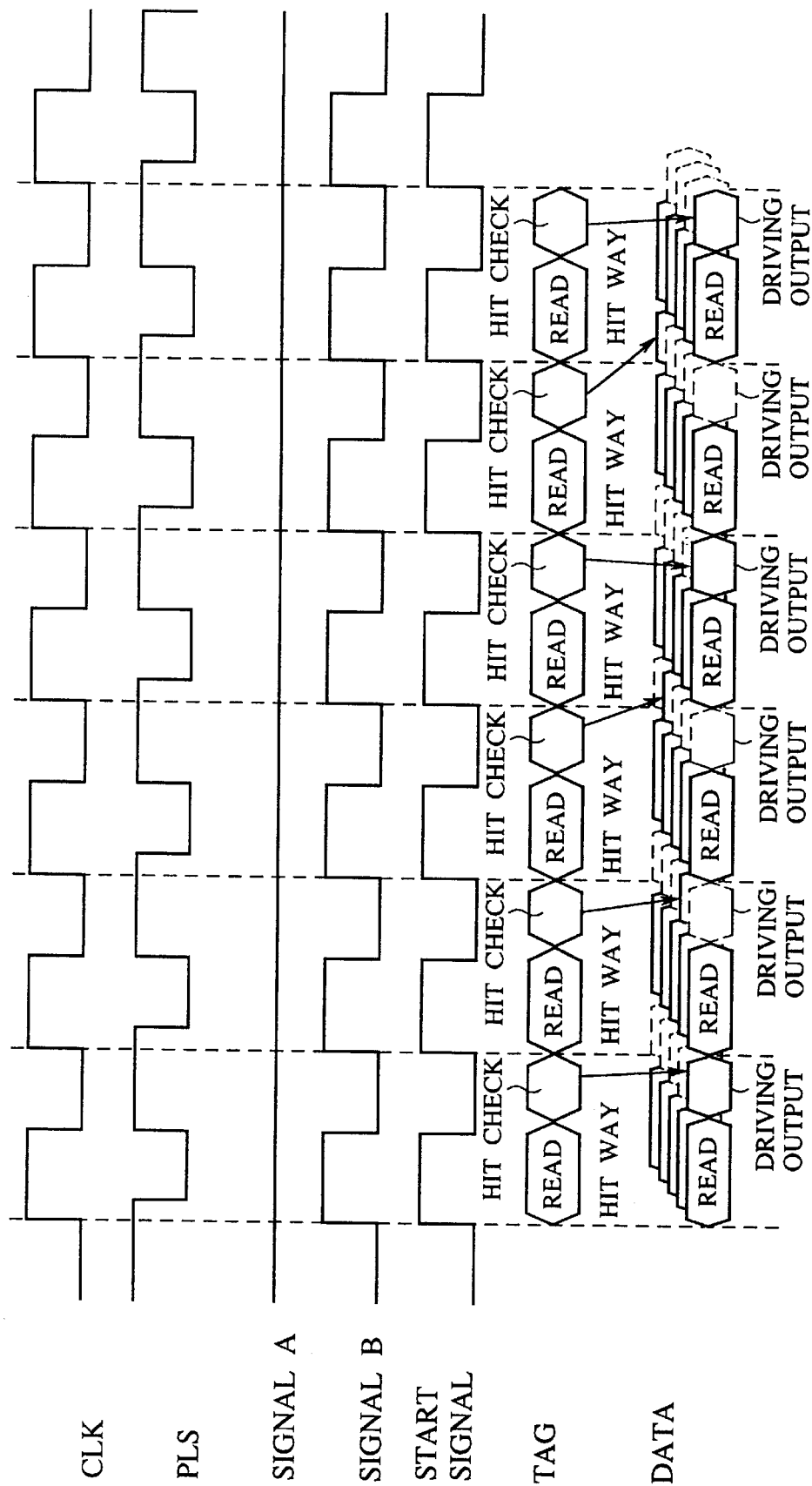

CACHE MEMORY SYSTEM HAVING HIGH AND LOW SPEED AND POWER CONSUMPTION MODES IN WHICH DIFFERENT WAYS ARE SELECTIVELY ENABLED DEPENDING ON A REFERENCE CLOCK FREQUENCY

BACKGROUND OF THE INVENTION

1. Field of the Invention

The present invention relates to a cache memory that dynamically switches between low- and high-speed modes according to the frequency of a reference clock signal and a computer system employing the cache memory.

2. Description of the Prior

FIG. 1 shows an n-way set-associative cache memory according to a prior art. The cache memory has n ways of tag memories 100, n ways of data memories 101 provided for the tag memories 100, respectively, tag comparators 102 provided for the tag memories 100, respectively, a hit controller 103, and a way selector 104. FIG. 2 is a timing chart showing an operation of the cache memory to see if the cache memory holds required data. The operation is carried out according to a reference clock signal CLK. An index, which is a part of a reference address, is used to read a tag out of each tag memory 100. Each tag comparator 102 checks the read tag to see if it hits a cache address tag, which is the remaining part of the reference address. A result of the checking is supplied to the hit controller 103, which informs the way selector 104 of a hit tag memory whose tag has hit the cache address tag. The index of the reference address is also used to read data out of the n ways of data memories 101. Among the n pieces of read data, the way selector 104 selects one read out of the data memory that is associated with the hit tag memory.

Under a high-speed operation, the prior art simultaneously reads the tag memories 100 and data memories 101. In this case, the ways 0 to n−1 of the cache memory involve at least "n−1" mishits. This means that electric power used to read "n−1" extra data memories 101 is wasted whenever the cache memory is accessed.

To reduce power consumption, the prior art uses a technique of finding out a hit tag memory firstly, and then reading data out of a data memory associated with the hit tag memory. This technique, however, is slow in operation speed.

The prior art fixedly uses one of the above two techniques, or selectively uses them according to external instructions. In any case, it is difficult for the prior art to properly use the two techniques. It is required, therefore, to provide a technique of properly switching the above two techniques from one to another in a system such as a battery-driven portable terminal or a notebook computer that must have both a high-speed characteristic and a low power dissipation characteristic at low-speed operation.

As explained above, there are two prior art techniques for driving the n-way set-associative cache memory. One technique simultaneously reads the tag memories 100 and data memories 101 to realize a high-speed operation at the cost of large power consumption. The other reads a necessary one of the data memories 101 after the completion of checking all of the tag memories 100, to reduce power consumption at the cost of operation speed.

Instead of fixedly employing one of the above two techniques, it is required to properly and automatically switch the techniques from one to another according to the operating conditions of a system employing the cache memory.

SUMMARY OF THE INVENTION

An object of the present invention is to provide a cache memory capable of dynamically switching a high-speed operation and a low-speed low-power-dissipation operation from one to another according to the frequency of a reference clock signal without depending on external instructions.

Another object of the present invention is to provide a computer system capable of automatically switching a mode of reading a cache memory incorporated therein to another when the frequency of a reference clock signal is changed, thereby reducing power dissipation when the frequency of the reference clock signal is low, and securing a high-speed characteristic of the cache memory when the operation frequency of the system is high.

In order to accomplish the objects, the present invention provides an n-way set-associative cache memory that checks each of tags read, according to an index, out of n ways of tag memories to see if it hits a given cache address tag, provides hit information indicating a hit one of the tag memories, selects data read out of one of n ways of data memories that is associated with the hit tag memory, and outputs the selected data. The cache memory at least has a reference pulse generator, a start signal generator, and an access controller. The reference pulse generator generates a reference pulse signal whose pulse width is set according to a read time of the tag memories. The start signal generator compares the pulse width of the reference pulse signal with a half-period of a reference clock signal that determines the operation speed of the cache memory, and according to a result of the comparison, provides one of low- and high-speed-mode start signals. The access controller provides an enable signal according to the start signal and hit information. The enable signal allows data stored in the data memory associated with the hit tag memory to be read.

The start signal generator generates the low-speed-mode start signal by delaying the reference clock signal for a give time if a half-period of the reference clock signal is longer than the pulse width of the reference pulse signal, and the high-speed-mode start signal equivalent to the reference clock signal if a half-period of the reference clock signal is shorter than the pulse width of the reference pulse signal. The start signal generator provides one of the low- and high-speed-mode start signals in a period of the reference clock signal next to the period of the same signal in which the comparison between the reference clock and pulse signals has been made.

In this way, the present invention dynamically controls the timing of reading the data memories according to the low- or high-speed-mode start signal depending on the frequency of the reference clock signal. When the frequency of the reference clock signal is low, only hit data memory is read, to save power. On the other hand, when the frequency of the reference clock signal is high, the tag memories and data memories are simultaneously read, to secure high speed characteristic.

If the access controller receives the hit information before the start signal, it supplies the enable signal only to the data memory associated with the hit tag memory. If the access controller receives the hit information after the start signal, it supplies the enable signal to every data memory, and upon receiving the hit information, stops supplying the enable signal to the data memories except to the one associated with the hit tag memory. This is "a semi-speed mode operation".

The semi-speed mode operation stops reading the data memories as soon as the hit information is provided, and therefore, is effective to maintain speed and reduce power consumption when the reading of the data memories is started before the hit information is provided.

The system according to the present invention selects a most suitable operational mode automatically, by switching the low-, semi-, and high-speed mode operations from one to another, based upon the frequency of the reference clock signal serving as a basis of the operation of the system which is changed by an input controller.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 4 shows a start signal generator incorporated in the cache memory of FIG. 3;

FIG. 8 is a timing chart showing a cache memory accessing operation according to a reference clock signal having a long period;

FIG. 9 is a timing chart showing a cache memory accessing operation according to a reference clock signal having a slightly short period;

FIG. 10 is a timing chart showing a cache memory accessing operation according to a reference clock signal having a shortest period;

DETAILED DESCRIPTION OF THE EMBODIMENTS

Figure 1:
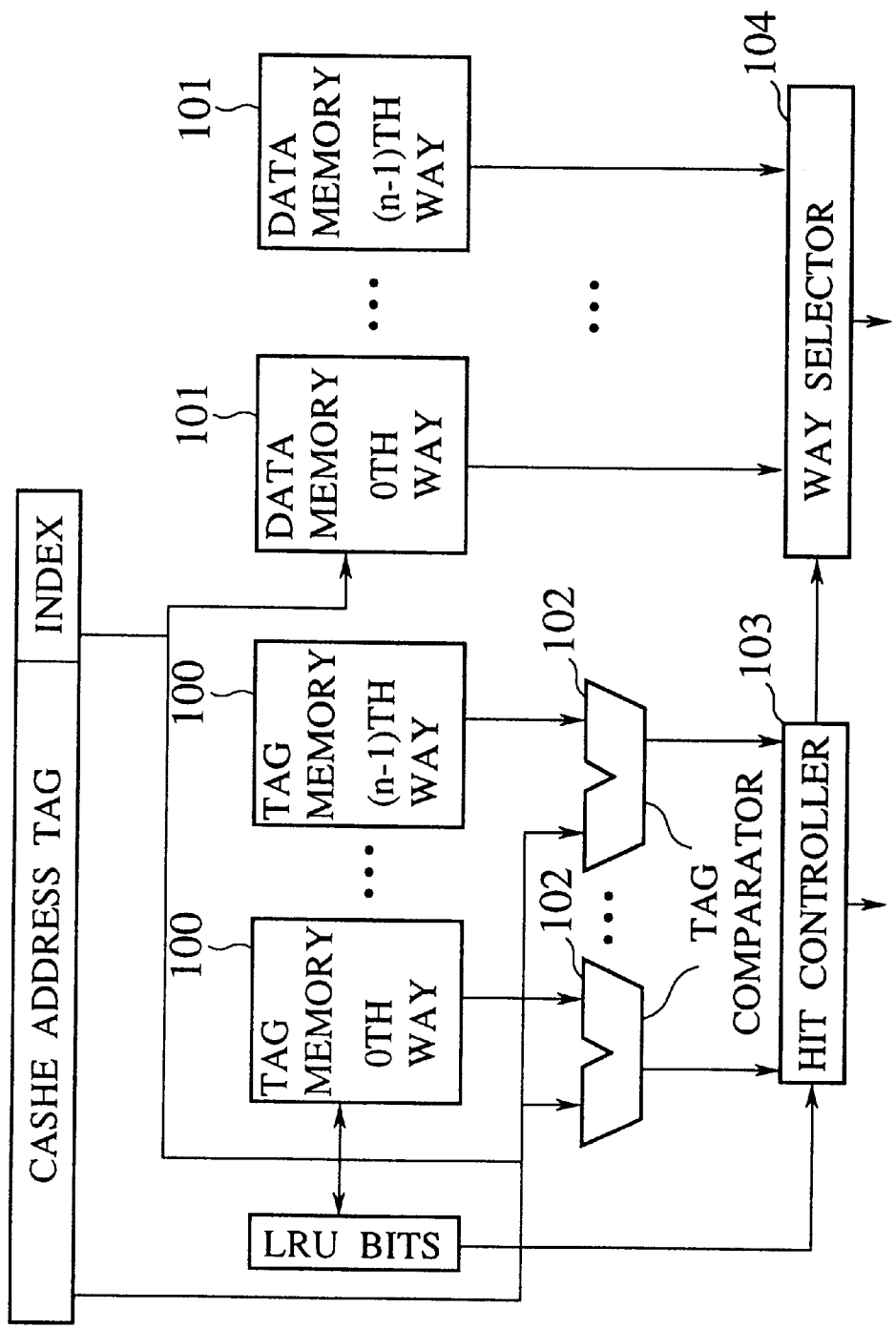
FIG. 1 shows an n-way set-associative cache memory according to a prior art.
Figure 2:
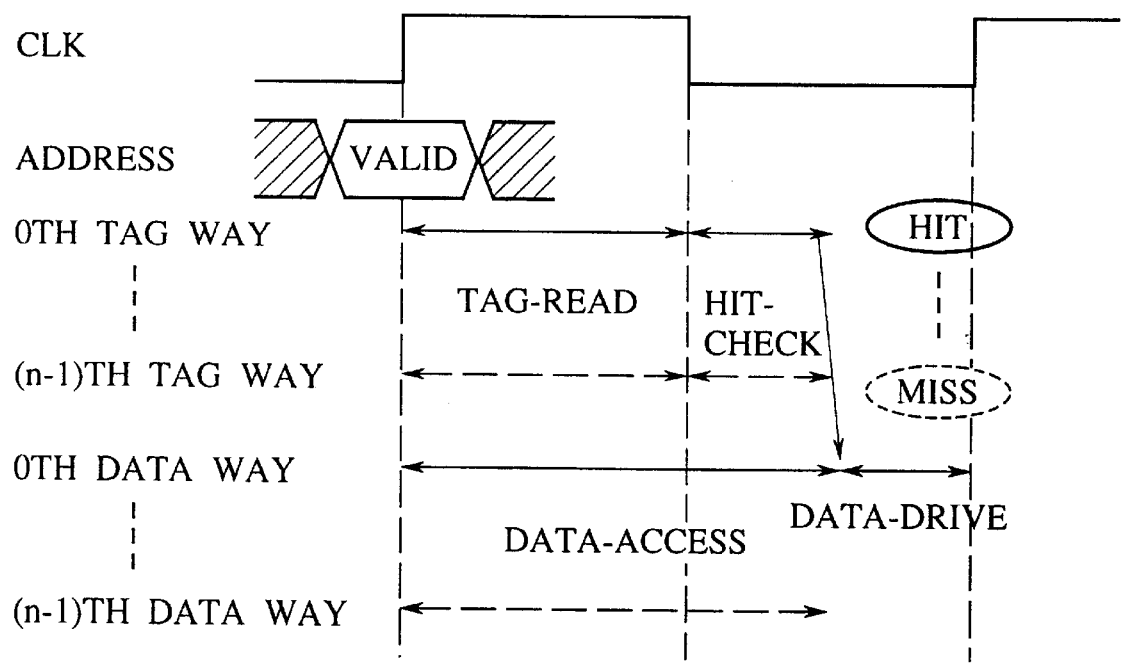
FIG. 2 is a timing chart showing the access timing of the cache memory of FIG. 1.

An embodiment of the present invention will be described with reference to the accompanying drawings. It is to be noted that the same or similar reference numerals are applied to the same or similar parts and elements throughout the drawings, and the description of the same or similar parts and elements will be omitted or simplified.

(Structure of Cache)

Figure 3:
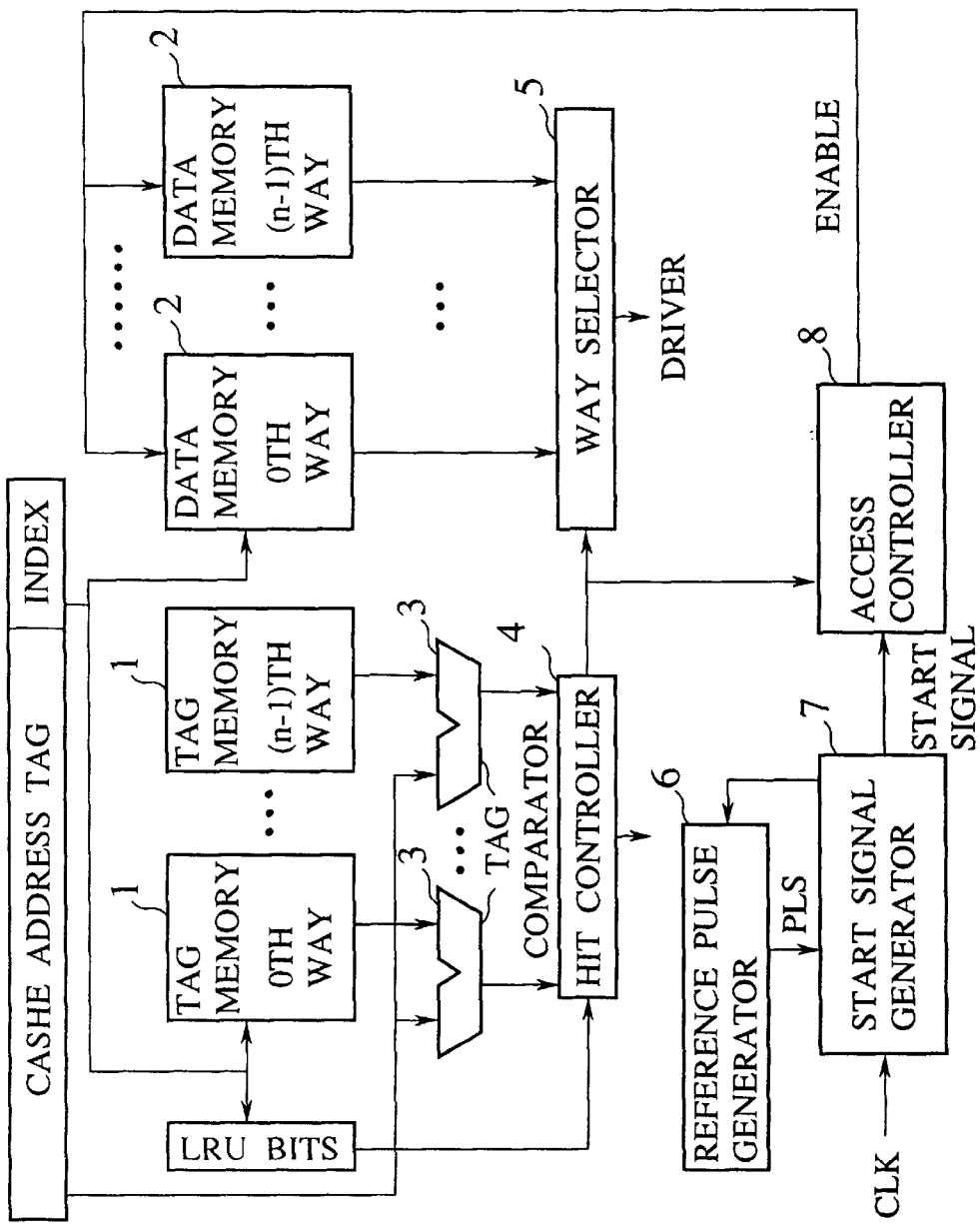
FIG. 3 shows an n-way set-associative cache memory according to an embodiment of the present invention.

FIG. 3 shows a cache memory according to the present invention. This cache memory dynamically determines data read timing according to the frequency of a reference clock signal CLK that determines the operation speed of the cache memory. When the operation speed is slow, the embodiment dynamically delays the start of accessing the cache memory and accesses only data memory associated with a hit tag memory, thereby minimizing power dissipation. When the operation speed is high, the embodiment simultaneously accesses tag and data memories, to secure high-speed characteristics.

The cache memory of FIG. 3 is an n-way set-associative cache memory. It has n ways of tag memories 1 and n-ways of data memories 2 that are associated with the tag memories 1, respectively. Each tag memory 1 stores a tag to be read according to an index. Each data memory 2 allows reading data stored therein in response to an enable signal and prohibits the same if the enable signal is stopped. Data stored in each data memory 2 is read according to the index. Each tag memory 1 has a tag comparator 3, which checks a tag read out of the tag memory 1 to see if it matches or hits a given cache address tag. The tag comparators 3 provide comparison results to a hit controller 4, which provides hit information to a way selector 5. According to the hit information, the way selector 5 selects data read out of one of the data memories 2 that is associated with the hit tag memory 1, and outputs the selected data. The cache memory of the present invention further has a reference pulse generator 6, a start signal generator 7, and an access controller 8.

The reference pulse generator 6 generates a reference pulse signal PLS having a constant pulse width. The constant pulse width is determined according to a read time of the tag memories 1 and a time required for checking a hit through tag comparators 3 and the hit controller 4.

The start signal generator 7 receives the reference pulse signal PLS from the reference pulse generator 6 and the reference clock signal CLK that determines the operation speed of the cache memory, and compares the pulse width of the reference pulse signal PLS with a half-period of the reference clock signal CLK. The reference clock signal CLK may be supplied by a reference clock generation circuit in a computer system incorporating the cache memory. If a half-period of the reference clock signal CLK is longer than the pulse width of the reference pulse signal PLS to indicate a low-speed mode, the start signal generator 7 generates a start signal, delaying the reference clock signal CLK for a time interval corresponding to a difference between a half-period of the reference clock signal CLK and the pulse width of the reference pulse signal PLS. The start signal is generated in a period of the reference clock signal CLK next to the period thereof in which the difference has been measured. If the half-period of the reference clock signal CLK is shorter than the pulse width of the reference pulse signal PLS to indicate a high-speed mode, the start signal generator 7 generates a start signal equivalent to the reference clock signal CLK in the next period of the reference clock signal CLK.

According to the start signal from the start signal generator 7 and the hit information from the hit controller 4, the access controller 8 supplies an enable signal for allowing the reading of data out of one of the data memories 2 that is associated with the hit tag memory 1. If the access controller 8 receives the hit information before the start signal, it supplies the enable signal only to the data memory 2 associated with the hit tag memory 1. If the access controller 8 receives the hit information after the start signal, it supplies the enable signal to all of the data memories 2 at first. Then, upon receiving the hit information, the access controller 8 stops immediately supplying the enable signal to the data memories except to the one associated with the hit tag memory 1 so that only the hit data memory 2 is read.

FIG. 4 shows the details of the start signal generator 7. The generator 7 has a NOR gate 9 for receiving the reference pulse signal PLS from the reference pulse generator 6 and the reference clock signal CLK, an OR gate 10 for receiving an output signal A of the NOR gate 9 and the reference clock signal CLK from a reference clock generation circuit (not shown), and a delay line loop (DLL) 11 (or a phase locked loop (PLL)). The DLL 11 receives an output signal B of the OR gate 10 and the reference clock signal CLK and provides the start signal. The start signal is a clock signal used to start reading the data memories 2 and is formed by equivalently using the reference clock signal CLK, or by retarding or delaying the same. The reference pulse generator 6 provides the reference pulse signal PLS in synchronization with a falling edge of the start signal provided by the DLL (or PLL) 11.

(Operation of Start Signal Generator)

The operation of the start signal generator 7 will be explained with reference to FIGS. 5A to 5C.

(a) The low-speed mode will be explained. Under this mode, the operation speed of the cache memory is slow, and a half-period of the reference clock signal CLK is quite longer than the pulse width of the reference pulse signal PLS. Then, the start signal is generated as shown in FIGS. 5A to 5C, in which FIG. 5A shows an initial state, FIG. 5B shows a transient state, and FIG. 5C shows a locked state.

Figure 5A:
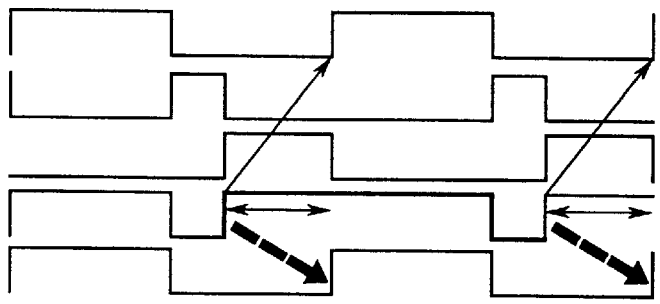
FIGS. 5A to 5C are timing charts showing a process of generating a start signal taken place in the start signal generator of FIG. 4.

In the initial state of FIG. 5A, the reference clock signal CLK and signal B are shifted from each other as indicated with arrow marks. A thick line indicates a period of the signal B. The duty factor of the signal B is not balanced. The DLL 11 compares a rising edge of the reference clock signal CLK with a rising edge of the signal B The reference pulse signal PLS is generated in synchronization with a falling edge of the start signal, which is equivalent to the reference clock signal CLK. The pulse width of the reference pulse signal PLS is defined by a read time of the tag memories plus a margin, as discussed in more detail below.

Figure 5B:
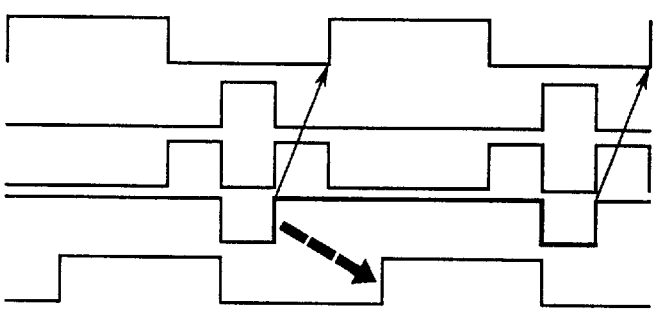

In the transient state of FIG. 5B, the DLL 11 changes the phase of the start signal so that the phase of the reference clock signal CLK is locked to that of the signal B. Since the signal B is ahead of the reference clock signal CLK, the DLL 11 delays the start signal.

Figure 5C:
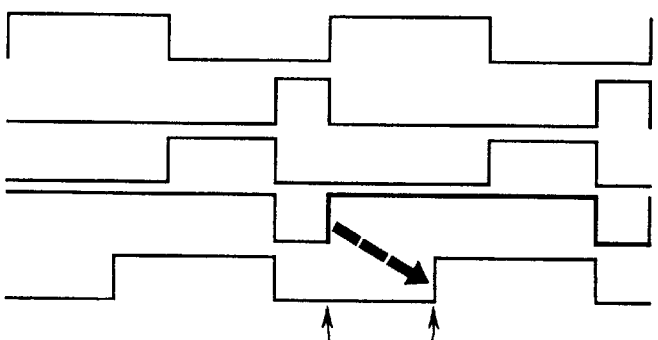

In the locked state of FIG. 5C, the phase of the start signal is delayed so that the phase of the signal B agrees with that of the reference clock signal CLK. Under this state, a locked low-speed-mode start signal is generated, and a read operation of the data memories 2 is started at a rising edge of the start signal in a period next to the period in which the phases of the reference clock signal CLK and signal B are synchronized with each other.

Figure 6:
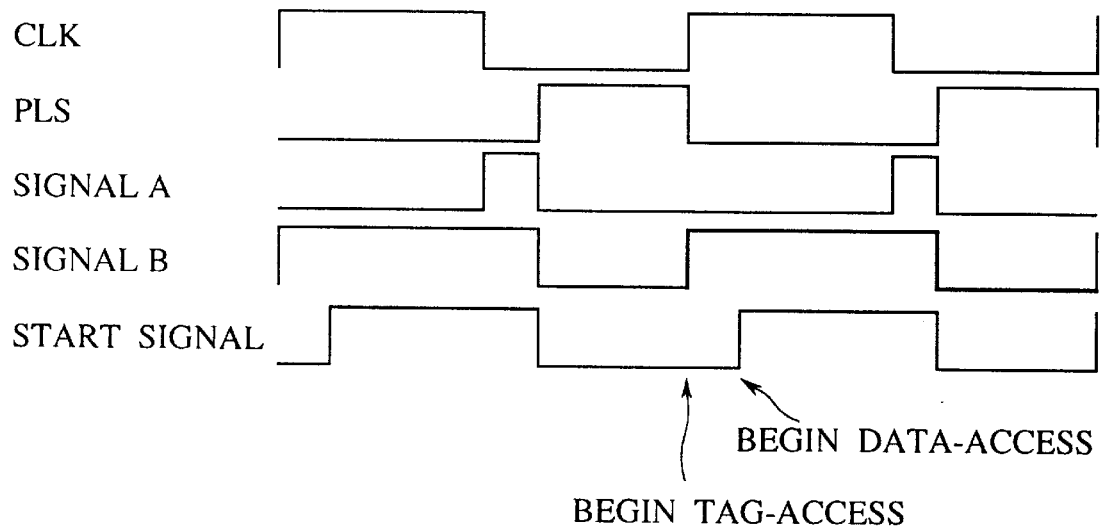
FIG. 6 is a timing chart showing a start signal generated according to a reference clock signal whose period is shorter than that of FIG. 5C.

(b) The medium-speed mode will be explained. The frequency of the reference clock signal CLK is high so that a half-period of the reference clock signal CLK has only a little difference with respect to the pulse width of the reference pulse signal PLS. In this case, a locked low-speed start signal of FIG. 6 is generated through similar processes of FIGS. 5A and 5B. In the medium-speed mode, there is a little difference between a half-period of the reference clock signal CLK and the pulse width of the reference pulse signal PLS, and therefore, a shift in the start signal is small. Accordingly, an interval between the start of a read operation of the tag memories 1 and the start of a read operation of the data memories 2 is shorter than that of FIG. 5C.

Figure 7:
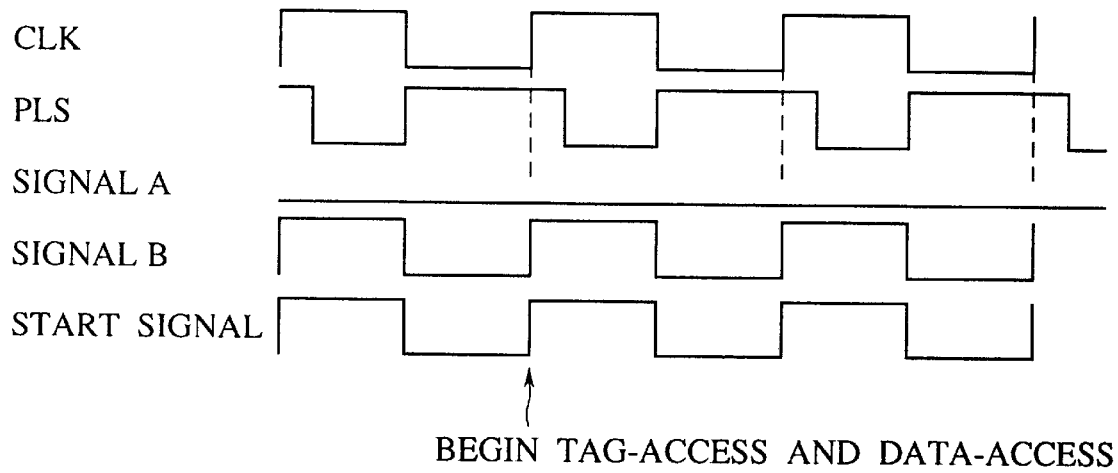
FIG. 7 is a timing chart showing a start signal generated according to a reference clock signal whose period is further shorter than that of FIG. 5C.

(c) The high-speed mode will be explained. The frequency of the reference clock signal CLK further increases so that a half-period of the reference clock signal CLK becomes shorter than the pulse width of the reference pulse signal PLS, as shown in FIG. 7. Then, the signal A is always in a low state. At this time, the signal B is equivalent to the reference clock signal CLK, to generate a locked high-speed-mode start signal that is equivalent to the reference clock signal CLK. This mode simultaneously reads the tag memories 1 and data memories 2.

(Read Operation)

FIGS. 8 to 10 are timing charts showing a read operation of the tag memories 1 and data memories 2 carried out according to the reference clock signal CLK, reference pulse signal PLS, signals A and B, and a locked start signal.

(a) FIG. 8 shows the low-speed mode with the frequency of the reference clock signal CLK being low as shown in FIG. 5C. The pulse width of the reference pulse signal PLS is compared with the half-period of the reference clock signal CLK. It is checked to see if the reference clock signal CLK rises while the reference pulse signal PLS is high. If it is so, the high-speed mode is started, and if not so, the low-speed mode of low power consumption is started. An interval between a fall of the reference pulse signal PLS and a rise of the next period of the reference clock signal CLK is detected to generate the signal A. A read operation of the data memories 2 is delayed by a high-level interval of the signal A. If the delayed start of reading the data memories 2 is before the completion of checking tags as shown in FIG. 8, only a hit one of the data memories 2 is read to realize the low-speed mode with minimum power dissipation.

(b) FIG. 9 shows the medium-speed mode with the frequency of the reference clock signal CLK being increased to decrease the difference between the half-period of the reference clock signal CLK and the pulse width of the reference pulse signal PLS as shown in FIG. 6. In FIG. 9, the start of reading the data memories 2 is slightly earlier than the completion of checking the tag memories 1. In this case, the reading of the data memories 2 is started before the start of checking the tag memories 1, so that the reading of the data memories 2 is surely completed within a period of the reference clock signal CLK. Namely, all of the data memories 2 are to be read. If the checking of the tag memories 1 completes and the hit controller 4 in FIG. 3 provides the access controller 8 with hit information during the reading of the data memories 2, the access controller 8 stops the enable signal to the data memories 2 except to the data memory 2 associated with the hit tag memory. As a result, only the hit data memory is read, and the reading of the other data memories is stopped. The medium-speed mode may need more power than the low-speed mode that reads only a hit data memory but less power than the prior art that never stops the reading of even mishit data memories. Compared with simultaneously reading the tag memories 1 and data memories 2, the medium-speed mode consumes less power.

(c) FIG. 10 shows the high-speed mode with the frequency of the reference clock signal CLK being high as shown in FIG. 7. The half-period of the reference clock signal CLK is shorter than the pulse width of the reference pulse signal PLS, and therefore, no signal A is detected. Hence, the signal A is always in a low state as shown in FIG. 10. Then, the reading of the data memories 2 is started at a rise of the reference clock signal CLK. Namely, the data memories 2 are read simultaneously with the reading of the tag memories 1 and are accessed thoroughly. This mode consumes more power than the low- or medium-speed mode but secures the highest speed operation.

In this way, the present invention dynamically changes the start of reading the data memories 2 according to the frequency of the reference clock signal CLK, to properly achieve the low-power-dissipation characteristic or the high-speed characteristic.

(Examples of Read Operations)

Figure 11A:
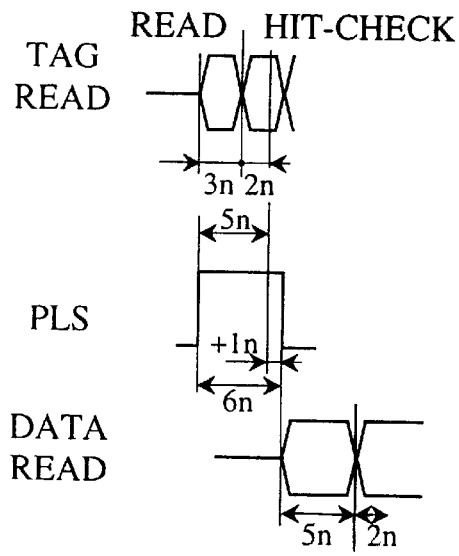
FIG. 11A shows a tag read time and a data read time.
Figure 11B:
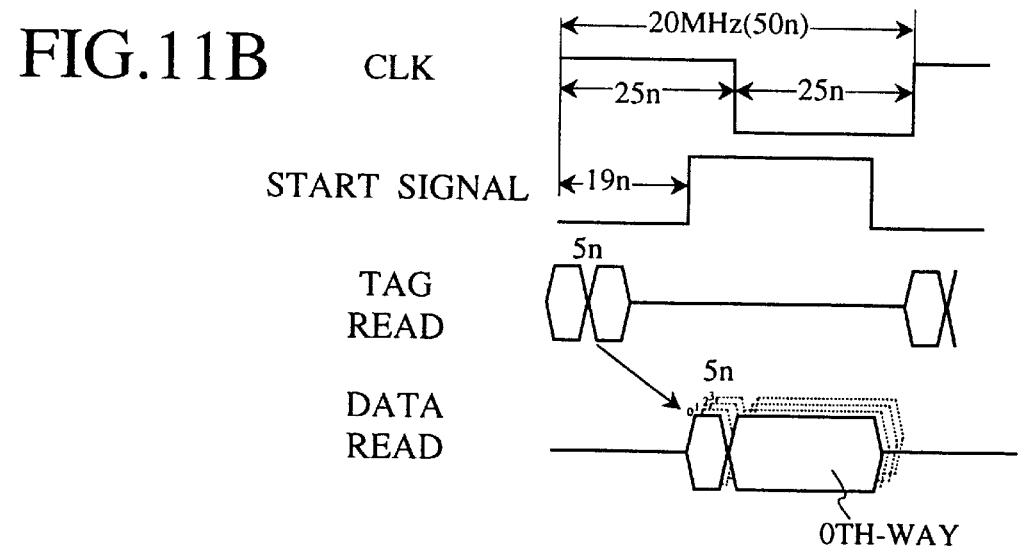
FIG. 11B is a timing chart showing a low-speed mode operation under the conditions of FIG. 11A.
Figure 11C:
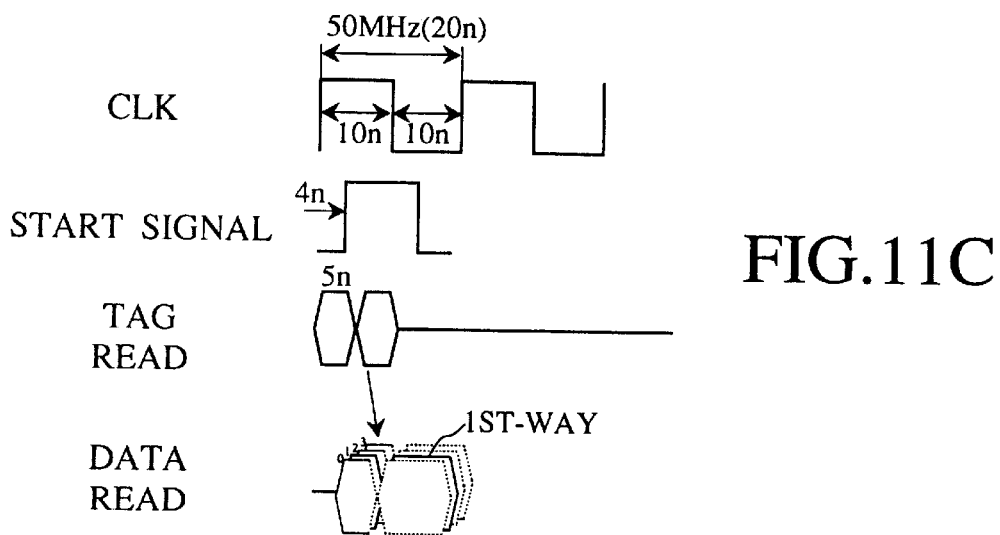
FIG. 11C is a timing chart showing a semi-speed mode operation under the conditions of FIG. 11A.

FIGS. 11A–11C show the details of operations of the cache memory according to the present invention. Although the cache memory of the present invention is operable at various pulse widths and frequencies, the example of FIG. 11A involves three nanoseconds for reading the tag memories 1, two nanoseconds for checking a hit (or for determining a hit tag memory), five nanoseconds for reading stored data, and two nanoseconds for providing data outside. The pulse width of the reference pulse signal PLS is determined according to a point when the tag memories 1 are checked completely. It is preferable to include a margin of time interval in the determination of the pulse width of the reference pulse signal. Hence, the pulse width of the reference pulse signal PLS is defined as a sum of the read time of the tag memories, the time required for checking the hit and the margin. Here, we assume the operational margin as one nanosecond. In FIG. 11A, adding the margin of one nanosecond, the pulse width of the reference pulse signal PLS is settled to be six nanoseconds (=3n+2n+1n (a margin)). Hereinafter, we will use the above settled pulse width of 6 ns of the reference pulse signal.

FIG. 11B is a timing chart showing the low-speed mode under the above condition. The frequency of the reference clock signal CLK is 20 MHz. The start signal is delayed by a difference between a half period of 25 nanoseconds (ns or nsec) of the reference clock signal CLK and the pulse width of 6 nsec of the reference pulse signal PLS. Under the low-speed mode, the tag memories 1 are read and checked in response to a rise of the reference clock signal CLK, and the reading of the data memories 2 is started 19 nsec after the same rise. At this time, the data memory to be read is already determined. Accordingly, only the data memory in question is read from the beginning. In FIG. 11B, the data memory of the 0th way is read. The low-speed mode realizes minimum power dissipation.

In FIG. 11C, the frequency of the reference clock signal CLK is 50 MHz. This is the semi-speed (medium-speed) mode. A half period of the reference clock signal CLK is 10 nsec. The start signal is delayed by a difference between the half-period of 10 nsec and the pulse width of 6 nsec of the reference pulse signal PLS. As a result, the reading of the data memories 2 starts 4 nsec after a rise of the reference clock signal CLK. At this time, the checking of the tag memories 1 is incomplete, and therefore, all of the data memories 2 are activated for 2 nsec. As soon as the checking of the tag memories 1 completes, all of the data memories 2 except the hit one are deactivated. In the example of FIG. 11C, the first one of the data memories 2 is the hit data memory. The semi-speed (medium-speed) mode reduces power dissipation while maintaining high-speed characteristics.

(System Organization)

Figure 12A:
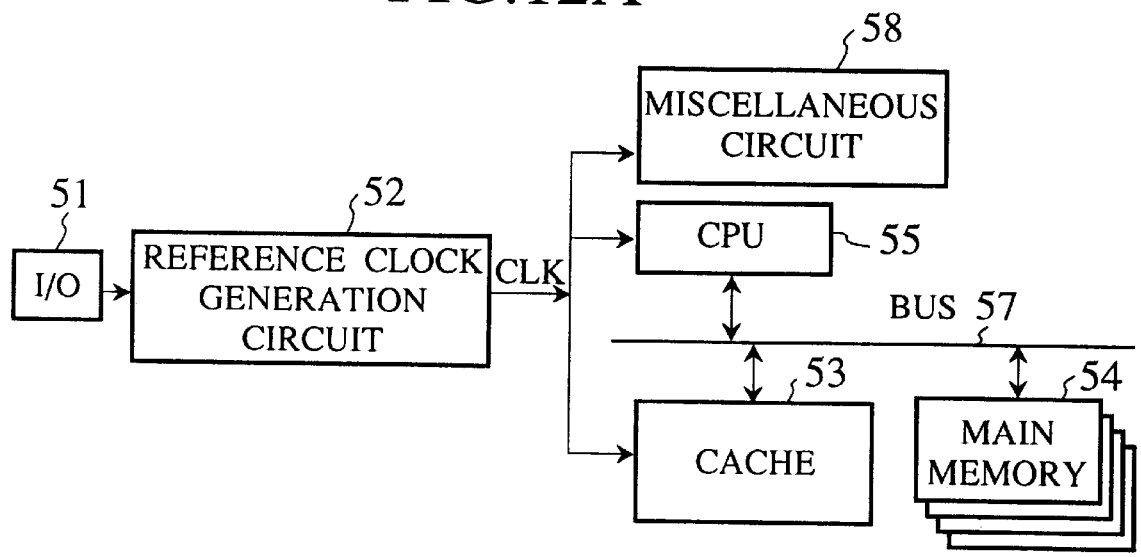
FIG. 12A shows a computer system employing the cache memory of the present invention as a secondary cache system.

Systems incorporating the cache memory of the present invention will be explained. FIG. 12A shows a computer having a secondary cache system. A bus 57 connects a CPU 55, a cache memory 53, and a main memory 54 to one another. The CPU 55, cache memory 53, and miscellaneous circuits 58 receive a reference clock signal CLK generated by a reference clock generation circuit or generator 52. The frequency of the reference clock signal CLK is variable between a low frequency and a high frequency according to a signal from an input controller 51. When the system must operate at high speed, the input controller 51 is manipulated to let the reference clock generator 52 generate a reference clock signal CLK of high frequency. When the system must operate at low power consumption, for example, in a standby mode of a portable telephone, the input controller 51 is manipulated to let the reference clock generator 52 generate a reference clock signal CLK of low frequency. While the CPU 55 and miscellaneous circuits 58 are being controlled according to the reference clock signal CLK, the cache memory 53 is automatically switched between the low- and high-speed modes in response to a change in the frequency of the reference clock signal CLK. If the frequency of the reference clock signal CLK is intermediate, the medium-speed mode is carried out to read all ways of the cache memory 53 at first, and in the middle, stop the read operation of all of the ways except a hit one, to reduce power consumption.

Figure 12B:
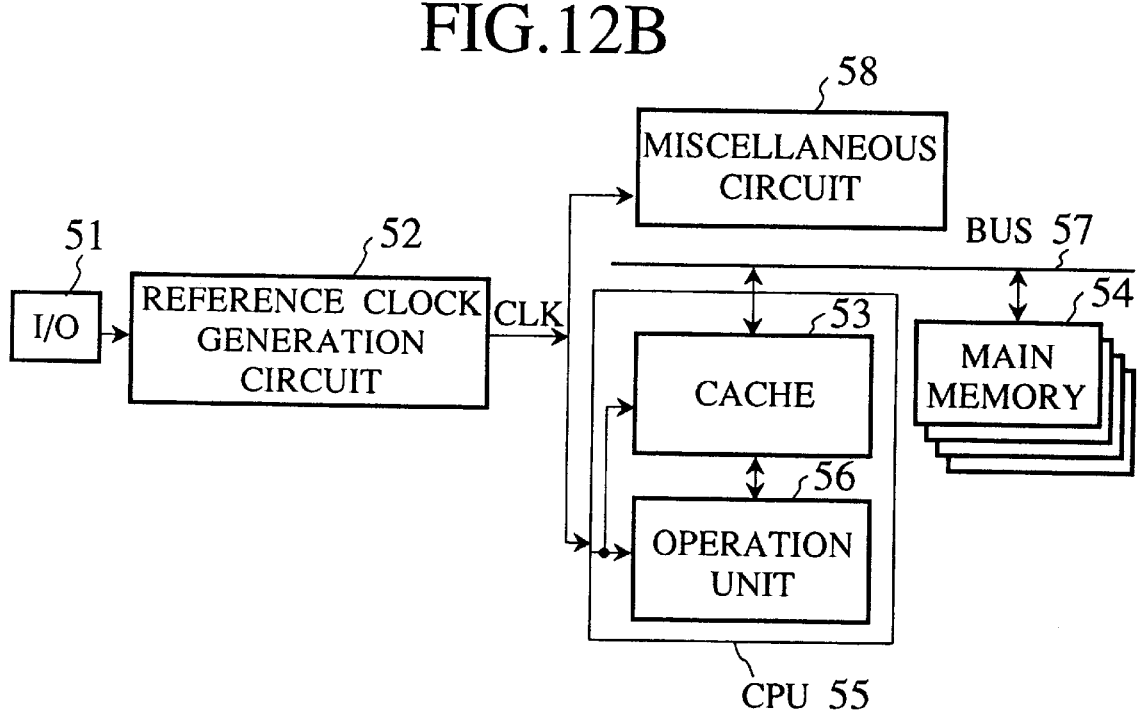
FIG. 12B shows a computer system incorporating the cache memory of the present invention in a CPU.

FIG. 12B shows a computer, in which a cache memory is incorporated in a CPU 55. The CPU 55 is connected to a main memory 54 through a bus 57, to send and receive data. Similar to the system of FIG. 12A, a reference clock generation circuit or generator 52 generates a reference clock signal CLK, which is supplied to an operation unit 56 and the cache memory 53 in the CPU 55. As explained above, the cache memory 53 compares a half-period of the reference clock signal CLK with the pulse width of a reference pulse signal PLS, to automatically switch the low-power-dissipation operation and high-speed mode operation from one to another. According to system requirements, an input controller 51 is manipulated to dynamically change the read mode of the cache memory 53, without direct instruction to the cache memory.

The frequency of the reference clock signal CLK may be varied according to system specifications. For example, it may be varied between 500 Kilohertz (KHz) and 300 megahertz (MHz).

Various modifications will become possible for those skilled in the art after receiving the teachings of the present disclosure without departing from the scope thereof.

What is claimed is:

1. An n-way set-associative cache memory for checking each of tags read, according to an index, out of n tag memories of the cache memory to see if each tag read hits a given cache address tag, providing hit information indicating a hit tag memory among the n tag memories, selecting a datum among n data memories that is associated with the hit tag memory, and outputting the selected datum, the cache memory further comprising:

(a) a reference pulse generator for generating a reference pulse signal whose pulse width is set according to a read time of the n tag memories and a time required for checking a hit;

(b) a start signal generator for comparing the pulse width of the reference pulse signal with a half-period of a reference clock signal, which determines the operation speed of the cache memory, and according to a result of the comparison, providing one of a low-speed-mode start signal and a high-speed-mode start signal; and (c) an access controller for providing an enable signal according to the start signal and hit information, the enable signal allowing data stored in the data memory associated with the hit tag memory to be read.

2. The cache memory of claim 1, wherein the start signal generator provides one of the low-speed-mode start signal and high-speed-mode start signal in a period of the reference clock signal next to the period of the reference clock signal in which the comparison has been made.

3. The cache memory of claim 2, wherein the start signal generator generates the low-speed-mode start signal by delaying the reference clock signal for a given time if a half-period of the reference clock signal is longer than the pulse width of the reference pulse signal, and generates a high-speed-mode start signal equivalent to the reference clock signal if a half-period of the reference clock signal is shorter than the pulse width of the reference pulse signal.

4. The cache memory of claim 1, wherein the access controller supplies the enable signal only to the data memory associated with the hit tag memory when receiving the hit information before the low-speed-mode start signal, or to all of the data memories when receiving the hit information after the high-speed-mode start signal.

5. The cache memory of claim 1, wherein the access controller supplies the enable signal to all ways of the data memories, and upon receiving the hit information, stops supplying the enable signal to the data memories except to the data memory associated with the hit tag memory.

6. The cache memory of claim 1, wherein the start signal generator consists of:

a NOR circuit for receiving the reference pulse signal and the reference clock signal;

an OR circuit for receiving an output signal of the NOR circuit and the reference clock signal; and a delay line loop for receiving an output signal of the OR circuit and the reference clock signal and providing one of the low-speed-mode start signal and high-speed-mode start signal.

7. The cache memory of claim 1, wherein the start signal generator consists of:

a NOR circuit for receiving the reference pulse signal and the reference clock signal;

an OR circuit for receiving an output signal of the NOR circuit and the reference clock signal; and a phase locked loop for receiving an output signal of the OR circuit and the reference clock signal and providing one of the low-speed-mode start signal and high-speed-mode start signal.

8. A system having an n-way set-associative cache memory for checking each of tags read, according to an index, out of n tag memories of the cache memory to see if each tag read hits a given cache address tag, providing hit information indicating a hit tag memory among the n tag memories, selecting a datum among n data memories that is associated with the hit tag memory, and outputting the selected datum, the system further comprising:

a) an input controller for switching a system operation frequency to another;

b) a reference clock generator for generating a reference clock signal whose frequency changes depending on a signal from the input controller;

c) a central processing unit (CPU) connected to the reference clock generator;

d) the cache memory connected to the reference clock generator having two modes of reading consisting of a low-speed-mode supplying an enable signal to a data memory associated with a hit tag memory and a high-speed-mode supplying the enable signal to all of data memories simultaneously, a mode of reading the cache memory being automatically switched to another mode according to the frequency of the reference clock signal; and e) a main memory connected to the CPU and cache memory through a bus.

9. A system having an n-way set-associative cache memory for checking each of tags read, according to an index, out of n tag memories of the cache memory to see each tag read hits a given cache address tag, providing hit information indicating a hit tag memory among the n tag memories, selecting a datum among n data memories that is associated with the hit tag memory, and outputting the selected datum, the system further comprising:

a) an input controller for switching a system operation frequency to another;

b) a reference clock generator for generating a reference clock signal whose frequency changes depending on a signal from the input controller;

c) a central processing unit (CPU) connected to the reference clock generator;

d) the cache memory connected to the reference clock generator, a mode of reading the cache memory being automatically switched to another mode according to the frequency of the reference clock signal, comprising:

a reference pulse generator for generating a reference pulse signal whose pulse width is set according to a read time of the n tag memories;

a start signal generator for comparing the pulse width of the reference pulse signal with a half-period of the reference clock signal, and according to a result of the comparison, providing one of a low-speed-mode start signal and a high-speed-mode start signal; and an access controller for providing an enable signal according to the start signal and the hit information, the enable signal allowing data stored in the data memory associated with the hit tag memory to be read; and e) a main memory connected to the CPU and cache memory through a bus.

10. The system of claim 9, wherein the start signal generator provides one of the low-speed-mode start signal and high-speed-mode start signal in a period of the reference clock signal next to the period of the reference clock signal in which the comparison has been made.

11. The system of claim 10, wherein the start signal generator generates the low-speed-mode start signal by delaying the reference clock signal for a given time if a half-period of the reference clock signal is longer than the pulse width of the reference pulse signal, and generates a high-speed-mode start signal equivalent to the reference clock signal if a half-period of the reference clock signal is shorter than the pulse width of the reference pulse signal.

12. The system of claim 9, wherein the access controller supplies the enable signal only to the data memory associated with the hit tag memory when receiving the hit information before the low-speed-mode start signal, or to all of the data memories when receiving the hit information after the high-speed-mode start signal.

13. The system of claim 9, wherein the access controller supplies the enable signal to all ways of the data memories, and upon receiving the hit information, stops supplying the enable signal to the data memories except to the data memory associated with the hit tag memory.

14. A system having an n-way set-associative cache memory for checking each of tags read, according to an index, out of n tag memories of the cache memory to see if each tag read hits a given cache address tag, providing hit information indicating a hit tag memory among the n tag memories, selecting a datum among n data memories that is associated with the hit tag memory, and outputting the selected datum, the system further comprising:

a) an input controller for switching a system operation frequency to another;

b) a reference clock generator for generating a reference clock signal whose frequency changes depending on a signal from the input controller;

c) a central processing unit (CPU) at least having an operation unit and the cache memory that has two read modes consisting of a low-speed-mode supplying an enable signal to a data memory associated with a hit tag memory and a high-speed-mode supplying the enable signal to all of data memories simultaneously, a read mode being automatically changed to another read mode according to the frequency of the reference clock signal; and d) a memory connected to the CPU through a bus.

15. A system having an n-way set-associative cache memory for checking each of tags read, according to an index, out of n tag memories of the cache memory to see if each tag read hits a given cache address tag, providing hit information indicating a hit tag memory among the n tag memories, selecting a datum among n data memories that is associated with the hit tag memory, and outputting the selected datum, the system further comprising:

a) an input controller for switching a system operation frequency to another;

b) a reference clock generator for generating a reference clock signal whose frequency changes depending on a signal from the input controller;

c) a central processing unit (CPU) at least having an operation unit and the cache memory that automatically changes a read mode according to the frequency of the reference clock signal, the cache memory comprising:

a reference pulse generator for generating a reference pulse signal whose pulse width is set according to a read time of the n tag memories;

a start signal generator for comparing the pulse width of the reference pulse signal with a half-period of the reference clock signal, and according to a result of the comparison, providing one of a low-speed-mode start signal and a high-speed-mode start signal; and an access controller for providing an enable signal according to the start signal and hit information, the enable signal allowing data stored in the data memory associated with the hit tag memory to be read, and d) a memory connected to the CPU through a bus.

16. The system of claim 15, wherein the start signal generator provides one of the low-speed-mode start signal and high-speed-mode start signal in a period of the reference clock signal next to the period of the reference clock signal in which the comparison has been made.

17. The system of claim 16, wherein the start signal generator generates the low-speed-mode start signal by delaying the reference clock signal for a given time if a half-period of the reference clock signal is longer than the pulse width of the reference pulse signal, and generates a high-speed-mode start signal equivalent to the reference clock signal if a half-period of the reference clock signal is shorter than the pulse width of the reference pulse signal.

18. The system of claim 15, wherein the access controller supplies the enable signal only to the data memory associated with the hit tag memory when receiving the hit information before the low-speed-mode start signal, or to all of the data memories when receiving the hit information after the high-speed-mode.

19. The system of claim 15, wherein the access controller supplies the enable signal to all ways of the data memories, and upon receiving the hit information, stops supplying the enable signal to the data memories except to the data memory associated with the hit tag memory.

* * * * *